United States Patent
Nagai et al.

[11] Patent Number: 5,982,449
[45] Date of Patent: Nov. 9, 1999

[54] TELEVISION RECEIVER THAT PROVIDES GRADATION CORRECTION USING A CPU

[75] Inventors: Miho Nagai, Toyonaka; Takashi Yamaguchi, Ibaraki; Yutaka Nio, Osaka; Hideto Nakahigashi; Hideyo Uwabata, both of Takatsuki; Toshiaki Kitahara, Ibaraki; Chikara Gotanda, Takatsuki; Atsushi Ishizu, Ibaraki, all of Japan

[73] Assignee: Matsushita Electric Industrial Co., Ltd., Osaka, Japan

[21] Appl. No.: 08/780,253

[22] Filed: Jan. 8, 1997

[30] Foreign Application Priority Data

Jan. 10, 1996 [JP] Japan ................. 8-001988
Apr. 1, 1996 [JP] Japan ................. 8-078558
Apr. 1, 1996 [JP] Japan ................. 8-078560

[51] Int. Cl.$^6$ ........................... H04N 5/14
[52] U.S. Cl. ............ 348/553; 348/552; 348/555; 348/671; 348/672
[58] Field of Search .................. 348/552, 554, 348/555, 556, 558, 913, 731, 671, 672, 678, 686, 725, 553; H04N 5/14

[56] References Cited

U.S. PATENT DOCUMENTS

| | | | |
|---|---|---|---|
| 4,731,662 | 3/1988 | Udagawa et al. | 358/75 |
| 5,289,282 | 2/1994 | Tsuji | 348/624 |
| 5,359,367 | 10/1994 | Stockill | 348/552 |
| 5,467,142 | 11/1995 | Ichinokawa | 348/556 |
| 5,539,474 | 7/1996 | Tsunetomi | 348/558 |
| 5,570,134 | 10/1996 | Hong | 348/467 |
| 5,663,772 | 9/1997 | Uehara | 345/147 |
| 5,740,092 | 4/1998 | Miyake | 348/555 |
| 5,751,374 | 5/1998 | Ninomya | 348/555 |
| 5,760,840 | 6/1998 | Tani | 348/558 |
| 5,822,012 | 10/1998 | Jeon | 348/553 |
| 5,828,417 | 10/1998 | Itagaki | 348/553 |

FOREIGN PATENT DOCUMENTS

| | | |
|---|---|---|
| 0 534 262 | 3/1993 | European Pat. Off. . |
| 0 574 901 | 12/1993 | European Pat. Off. . |
| 0 710 016 | 5/1996 | European Pat. Off. . |
| 63-157202 | 6/1988 | Japan . |
| 3-283976 | 12/1991 | Japan . |
| 05037801 | 2/1993 | Japan . |
| 05053550 | 3/1993 | Japan . |
| 07123337 | 5/1995 | Japan . |
| 2 269 958 | 2/1994 | United Kingdom . |
| WO 96/19895 | 6/1996 | WIPO . |

*Primary Examiner*—John K. Peng
*Assistant Examiner*—Wesner Sajous
*Attorney, Agent, or Firm*—Ratner & Prestia

[57] ABSTRACT

A television receiver comprising an information extracting circuit for extracting information from a format or content of an input video signal, a video signal processing circuit for processing this video signal by a program or data, a memory for storing the program and data, a CPU for controlling, operating or driving these elements, and a display device for displaying an image. The video signal processing circuit can, under the control of the CPU, decode the signal, correct or set the picture quality such as gradation and sharpness, or adaptively process an on-screen display based on the input video signal. The television receiver is also able to adaptively extend the functions of the television receiver corresponding to various signal formats.

29 Claims, 10 Drawing Sheets

TELEVISION RECEIVER THAT PROVIDES GRADATION CORRECTION USING A CPU

BACKGROUND OF THE INVENTION

The present invention relates to a television receiver for controlling programmable signal processing adaptively corresponding to various signal formats by using a CPU.

In a conventional NTSC system television receiver, various picture quality corrections and setting are done, such as sharpness and gradation of luminance signal (Y) and color saturation of chroma signal (C) separated from NTSC composite signal by Y/C separation circuit, or functions for changeover of video input and on-screen display are provided for the request or convenience of the user.

However, the specifications of the television receiver requested by the users are becoming more and more sophisticated in the recent trend of multimedia, and numerous models must be developed to cope with these requests adequately. It is a subject for television receiver manufacturers to develop many models of television receivers differing in part of processing functions while maintaining common processing functions depending on the requests.

If a specification change or additional function occurs in a television receiver, it is hard to change the circuit composition according to the specification change of the receiver because the circuit composition of television receiver is realized by optimization. On the other hand, if more functions than necessary are incorporated in the television receiver, functions not needed by the user are built in the receiver, and the price of the receiver becomes higher.

Or when extending the functions of the television receiver, since the additional functions are diverse, the interface types of the additional function units and the internal circuit of the television receiver are also diverse, and plural interface circuits may be accommodated.

Still more, when the user of the television receiver connecting such units for extending the additional functions further desires functional changes of the additional function extension units by change of condition of use or the like, change or modification of the additional function extension units is required again, and it causes much labor and cost. At the same time, the content of the memory incorporated in the receiver must be changed.

SUMMARY OF THE INVENTION

It is hence an object of the invention to solve the above problems, and present a television receiver capable of processing signals adaptively corresponding to various television signal types, and providing various functions such as various picture quality setting, correction, and on-screen display. It is a further object to present a television receiver capable of extending the functions easily depending on the request of the user.

To achieve the objects, the television receiver of the invention comprises a memory storing a program for defining video signal decoding algorithm and various control data, programmable signal processing means for processing video signals according to the program, and a CPU for controlling the memory and signal processing means, wherein the CPU changes the content of the memory depending on the input video signal, or processes the video signal adaptively by using the program and control data from the memory.

For example, gray level of the video signal can be corrected in order to expand the contrast of a low contrast image. That is, the CPU processes data of video signal, calculates various operation parameters from the luminance distribution data to make up a gradation correction table, and writes into the memory. In succession, the programmable signal processing means corrects the gradation by using the data stored in the memory.

Moreover, scanning velocity modulation processing can be executed, for instance, depending on plural video signal modes by programmable velocity modulation processing means such as programmable filter for filtering process by using the program stored in the memory.

Furthermore, by adding an extension unit incorporating a processing circuit capable of adding a new processing function, and feeding an output signal in this video signal processing means, the function can be extended adaptively corresponding to various input signal formats.

DESCRIPTION OF THE PREFERRED EMBODIMENTS

Figure 1:
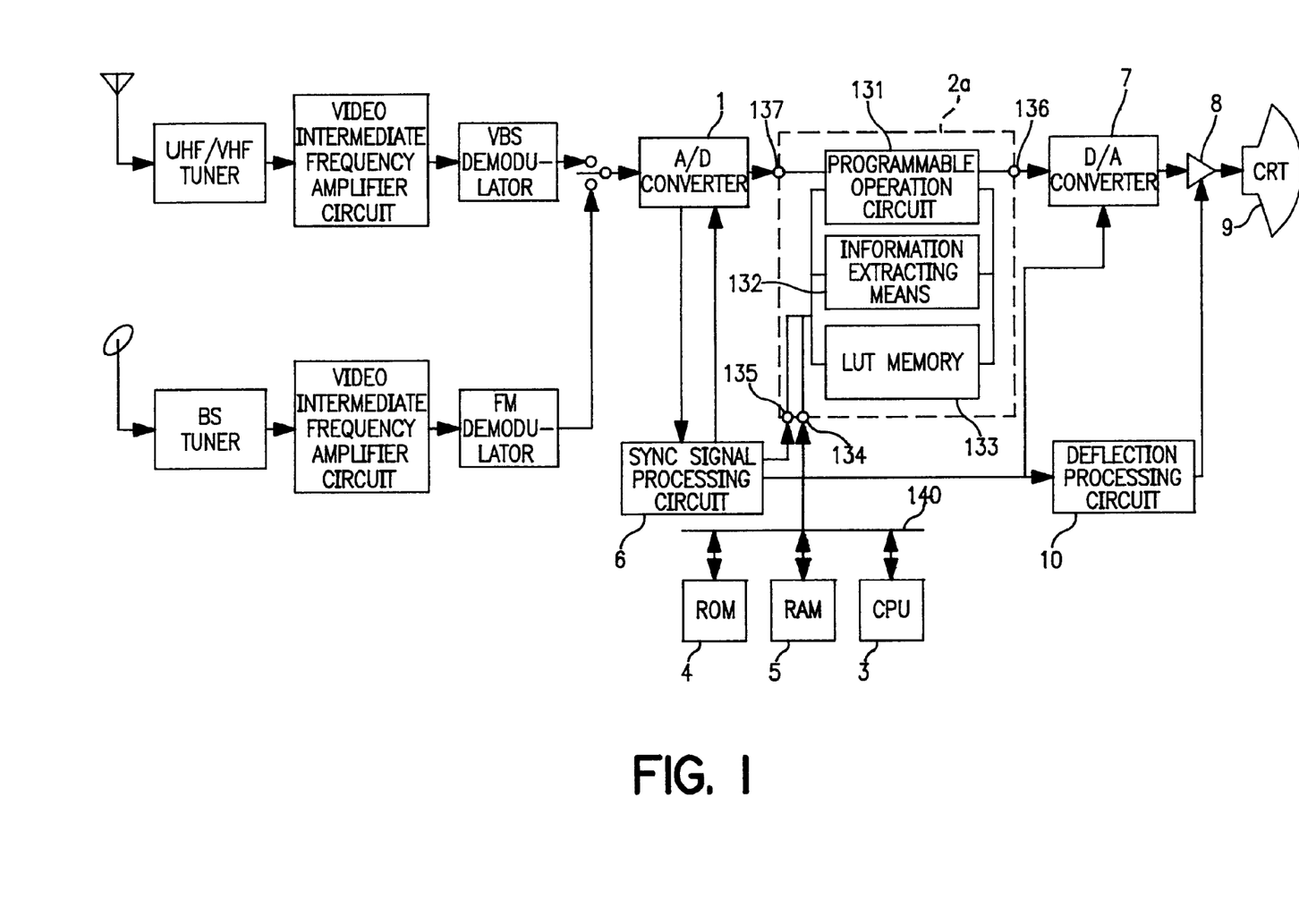
FIG. 1 is a block diagram of an embodiment according to the invention.

As a preferred embodiment of the invention, a television receiver for programmable signal processing by using a program and various data stored in a memory under the control of a CPU is shown in FIG. 1.

In FIG. 1, an input video signal is converted into a digital signal in an A/D converter 1, and is supplied into a signal processing circuit 2a through an input/output port 137. The signal processing circuit 2a is composed of a programmable operation circuit 131 which is the engine of signal processing, information extracting means 132, and an LUT (look-up table) memory 133, and is mutually connected, through an input/output port 134, to a CPU (central processing unit) 3, a ROM (read only memory) 4, and a RAM (random access memory) 5 through a bus 140. Also through an input/output terminal 135, it is also connected to a synchronizing (sync) signal processing circuit 6. The programmable operation circuit 131 is an operation circuit capable of changing the processing contents, and the procedure of operation is written in the ROM 4 as a micro program, and it is loaded in the programmable operation circuit 131 according to a load command from the CPU 3. Moreover, according to a control signal supplied to the input/output terminal 135, loading of micro program, start or end of operation, and other controls are effected. The output from the signal processing circuit 2a is issued from an output terminal 136, and is converted into an analog signal in a D/A converter 7. The analog RGB signals are supplied in a CRT 9 through a drive circuit 8, and a television image is displayed.

When the signal processing circuit 2a decodes a video signal, the content in the LUT memory 133 can be adaptively changed depending on the state of the video signal in stationary operation state. To realize such adaptive process, it is necessary to take in data in the midst of processing. That is, the information extracting means 132 is connected to the programmable operation circuit 131, and is designed to take in the input signal data or the data in the midst of decoding process, so that the data can be taken in at specified timing according to the control signal generated in the synchronous processing circuit 6. The taken data is transferred to the CPU 3 through the bus 140, and is operated as required in the CPU 3. Depending on the result, the content in the LUT memory 133 is changed partly or wholly. The programmable operation circuit 131 operates according to the changed data.

For example, one of the processes for utilizing such LUT memory 133 is gradation correction processing for expanding the contrast of a low contrast image. An example of flowchart for this gradation correction process is shown in FIG. 2.

Figure 2:
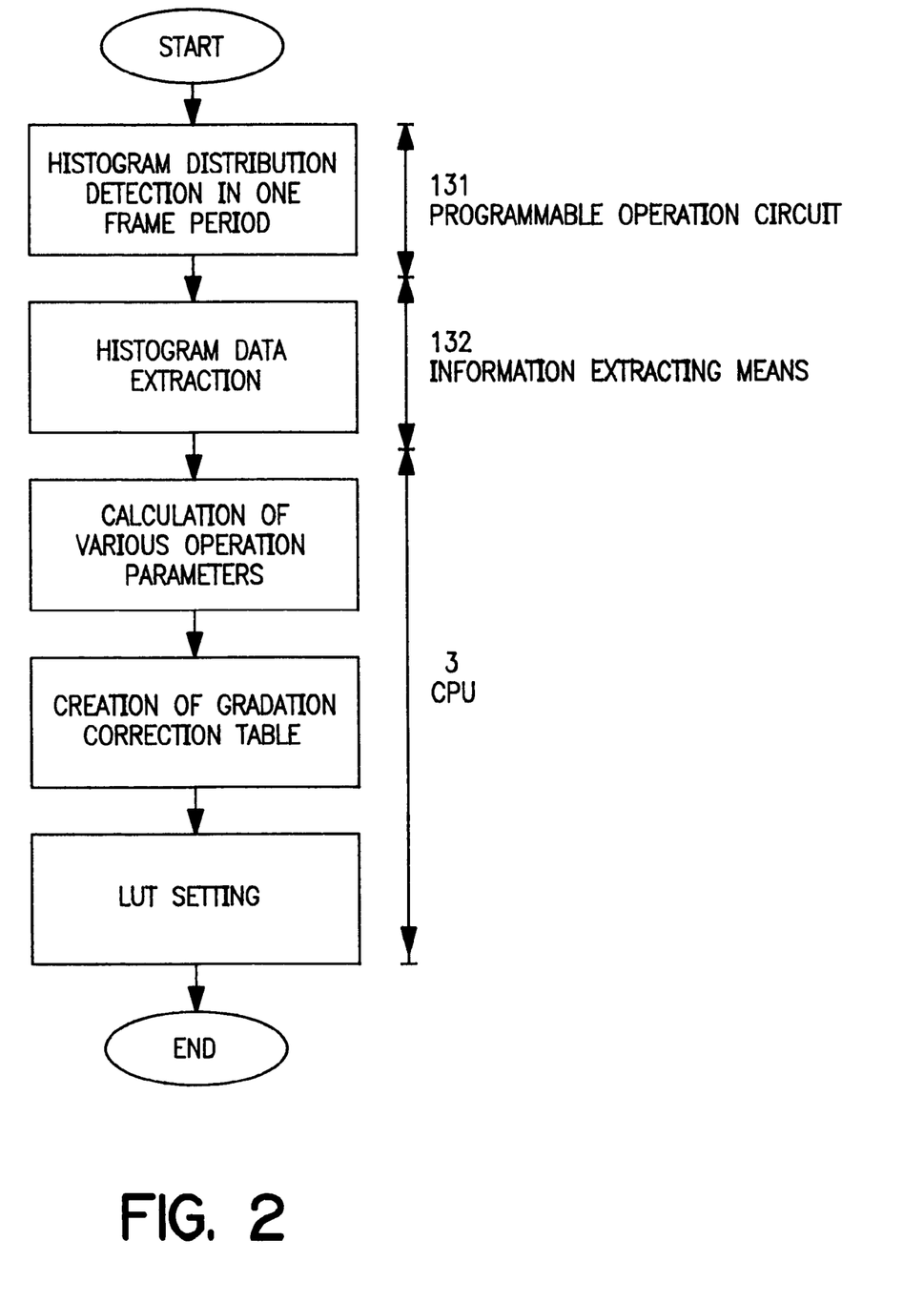
FIG. 2 is a flowchart of gradation correction process that can be done in the embodiment of the invention in FIG. 1.

In the flowchart shown in FIG. 2, first, the luminance distribution (histogram distribution) of video signals within one frame period is detected in the programmable operation circuit 131. Next, in the information extracting circuit 132, histogram data is extracted, and is taken into the CPU 3 through the bus 140.

The CPU 3 calculates various operation parameters from the histogram data extracted by the information extracting means 132, and creates a gradation correction table. The created gradation correction table is written into the LUT memory 133 of the signal processing circuit 2a, and the programmable operation circuit 131 processes the gradation correction according to the content in the LUT memory 133.

Figure 3:
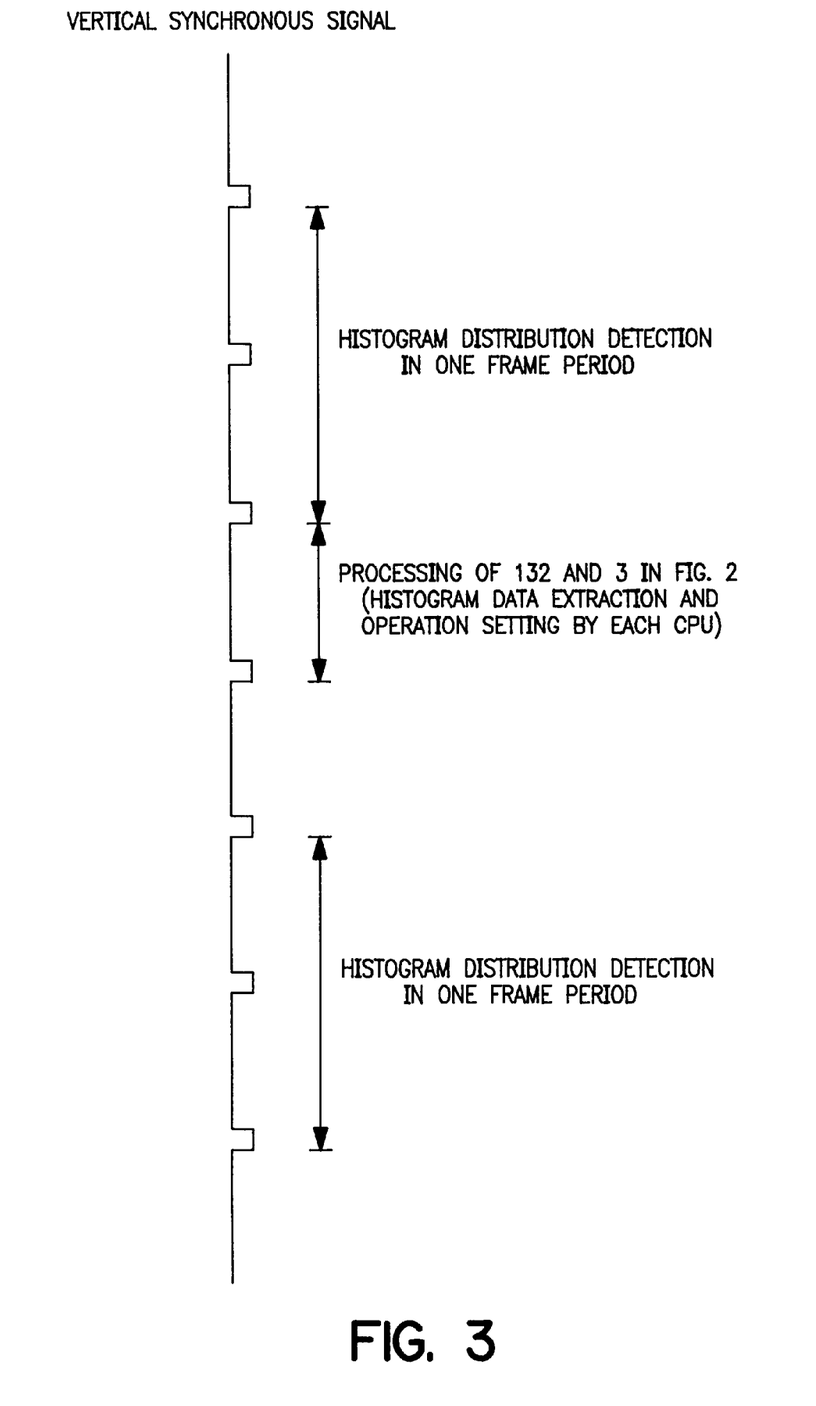
FIG. 3 is an explanatory diagram of control timing in the embodiment of gradation correction process.

FIG. 3 shows an example of control timing in this embodiment of gradation correction process. The histogram data extracted by the information extracting means 132 is transferred to the CPU 3 in a next field period, and specified operation is performed in the CPU 3. Before start of take-in of histogram data in next frame, data is set in the LUT memory 133, and the programmable operation circuit 131 processes gradation correction according to newly set data of the LUT memory. Therefore, gradation correction process can be done once in every two frames.

Thus, in the television receiver of the invention, since the information of video signal is extracted by the information extracting means, and the content in the look-up table can be changed depending on each video signal, adaptive video signal processing can be done depending on video signals of various formats.

Figure 4:
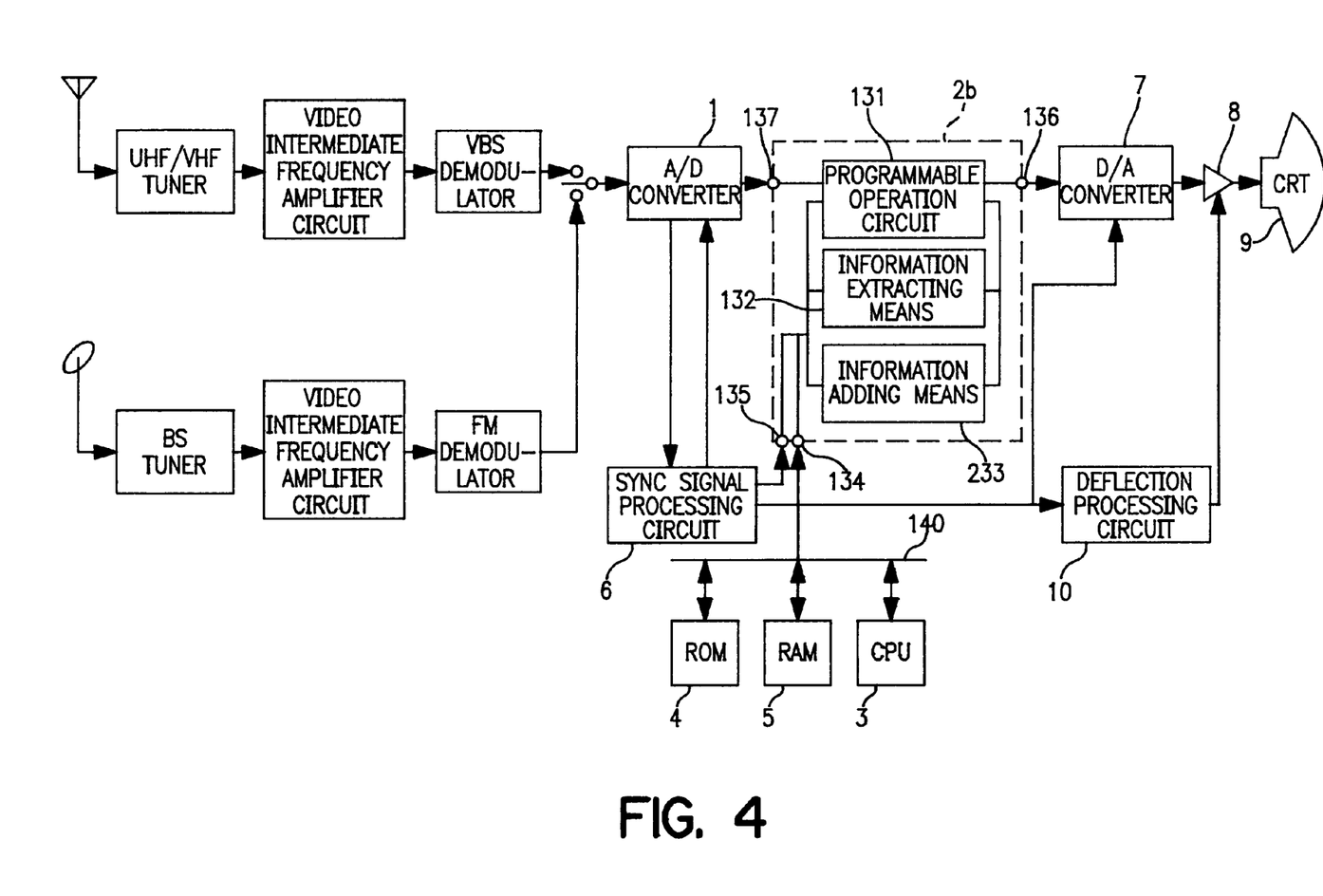
FIG. 4 is a block diagram of other embodiment according to the invention.

FIG. 4 shows other embodiment of the invention. In the embodiment in FIG. 4, a signal processing circuit 2b is composed of a programmable operation circuit 131, information extracting means 132, and information adding means 233, and is mutually connected, through an input/output port 134, to CPU 3, ROM 4 and RAM 5 through a bus 140. Other constituent elements are same as in FIG. 1, and explanations are omitted.

When decoding a video signal in the signal processing circuit 2b, it is necessary to add data to the video signal adaptively depending on the state of the video signal in stationary operation state. Such adaptive processing requires to take in the data in the midst of processing. That is, the information extracting means 132 is connected to the programmable operation circuit 131, and is designed to take in input signal data or data in the midst of decoding process, so that the data can be taken in at specified timing according to the control signal generated in the synchronous processing circuit 6.

The information adding means 233 reads out additional information already stored in the ROM 4 through the bus 140, and adds the information to the taken data. The programmable operation circuit 131 operates according to the added data. As one of the embodiments of such information adding process, processing of on-screen display is described below.

Figure 5:
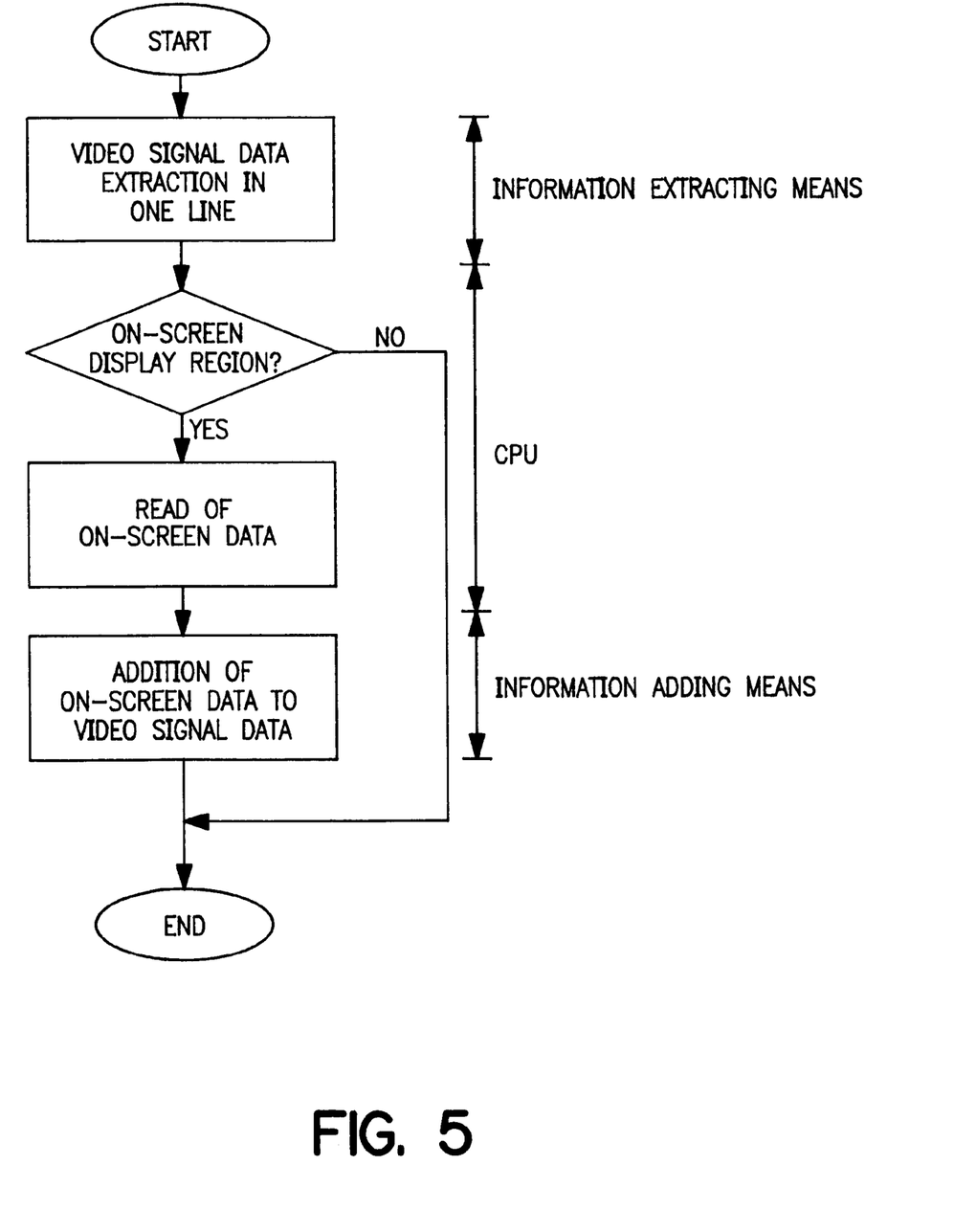
FIG. 5 is a flowchart of an embodiment for on-screen display.

FIG. 5 shows a flowchart of an embodiment of on-screen display. As shown in the flowchart in FIG. 5, first in the information extracting means 132 in FIG. 4, video signal data for the portion of one line processed in the programmable operation circuit 131 is extracted. The CPU 3 has a line counter disposed inside, and when the present line is judged to be in an on-screen display region, the on-screen data of the present line already stored in the ROM 4 is extracted. Next, the information adding means 233 adds the on-screen data to the extracted video signal data. The programmable operation circuit 131 realizes on-screen display by processing the video signal data to which the on-screen data is added.

In the television receiver of the invention, as mentioned above, by adding information to the video signal by information adding means, adaptive video signal processing can be executed on video signals of various formats.

In the recent television receivers, large screen models of a large screen CRT are in the mainstream, and a technique of scanning velocity modulation Is employed as one of means for correcting the sharpness of the image. However, in the trend of diversification of broadcast system and video media as mentioned above, conventionally, plural processing circuits (hardware) were needed for velocity modulation processing depending on plural video signal modes.

The television receiver of the invention does not require to prepare velocity modulation means depending on plural video signal modes as hardware, and is realized by one programmable velocity modulation means (for example, programmable filter means). An essential block diagram of an embodiment of the velocity modulation means is shown in FIG. 6.

Figure 6:
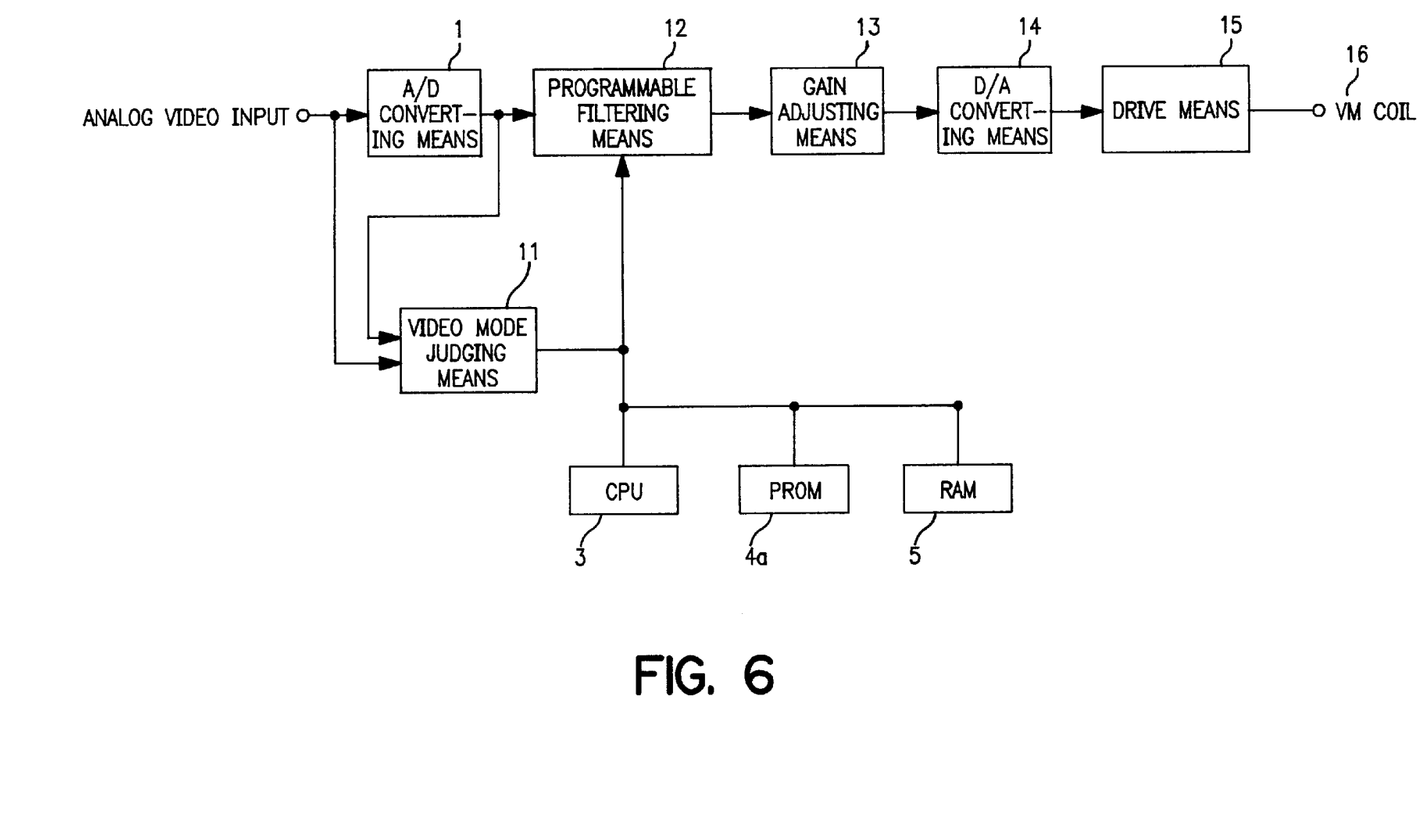
FIG. 6 is a block diagram of an embodiment of velocity modulation process according to the invention.

In FIG. 6, an input analog video signal is fed into A/D converting means 1 and video mode judging means 11. In the A/D converting means 1, the received analog video signal is converted into a digital video signal, and is sent out into programmable filter means 12 and video mode judging means 11. In the video mode judging means 11, the mode of the received video signal is judged, and the information is sent out into a CPU 3.

In the CPU 3, among plural programs preliminarily stored in a programmable ROM (hereinafter called PROM) 4a, a program suited to the received video mode is selected, and is read out and written into a RAM 5. Later, the CPU 3 reads out the program written in the RAM 5, and sends out to the programmable filter means 12. In the programmable filter means 12, a filter corresponding to the received program is composed, and the digital signal sent from the A/D converting means 1 is filtered depending on the mode of the video signal, and the result is sent out into gain adjusting means 13.

The gain adjusting means 13 adjusts the gain of the signal sent from the programmable filter means 12, and issues to D/A converting means 14. The D/A converting means 14 converts the signal from the gain adjusting means 12 into an analog signal, and issues to drive means 15. The drive means 15 drives a velocity modulation (VM) coil 16 depending on the signal sent from the D/A converting means and modulates the scanning velocity.

In an embodiment of velocity modulation process in the television receiver according to the invention, the velocity modulation depending on plural video signal modes can be processed by one programmable velocity modulating means.

Figure 7:
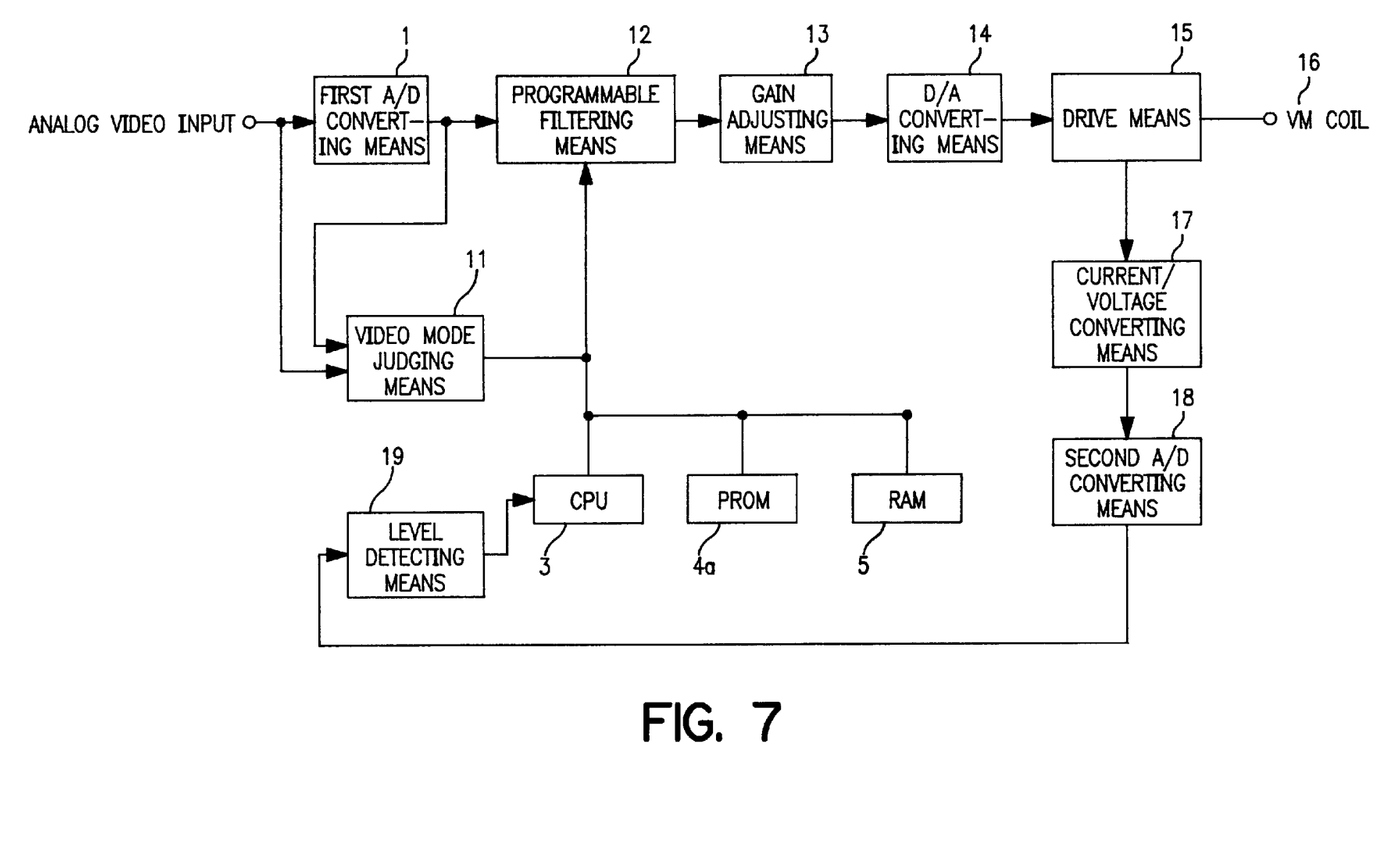
FIG. 7 is a block diagram of other embodiment of velocity modulation process according to the invention.

A modified example of scanning velocity modulation of the embodiment in FIG. 6 is shown in a block diagram in FIG. 7.

The operation of the velocity modulation process in FIG. 7 is basically same as the operation of the embodiment explained in FIG. 6, except that the value of the driving current for driving the VM coil is issued to current/voltage converting means 17 in the embodiment in FIG. 7. The current/voltage converting means 17 converts the received driving current value into a voltage value, and is issued to second A/D converting means 18. The second A/D converting means 18 converts the received voltage value into digital data, and is issued to level detecting means 19. The level detecting means 19 detects the level of the received digital data, and issues the result to the CPU 3. The CPU 3 changes the characteristic of the programmable filter means 12 depending on necessity on the basis of the detection result of the level detecting means 19. By repeating this series of operation, scanning velocity modulation process of superior characteristic may be realized.

Moreover, the television receiver of the invention, when provided with extension units for extending functions, can extend functions adaptively corresponding to various signal formats. Specific embodiments are described below.

Figure 8:
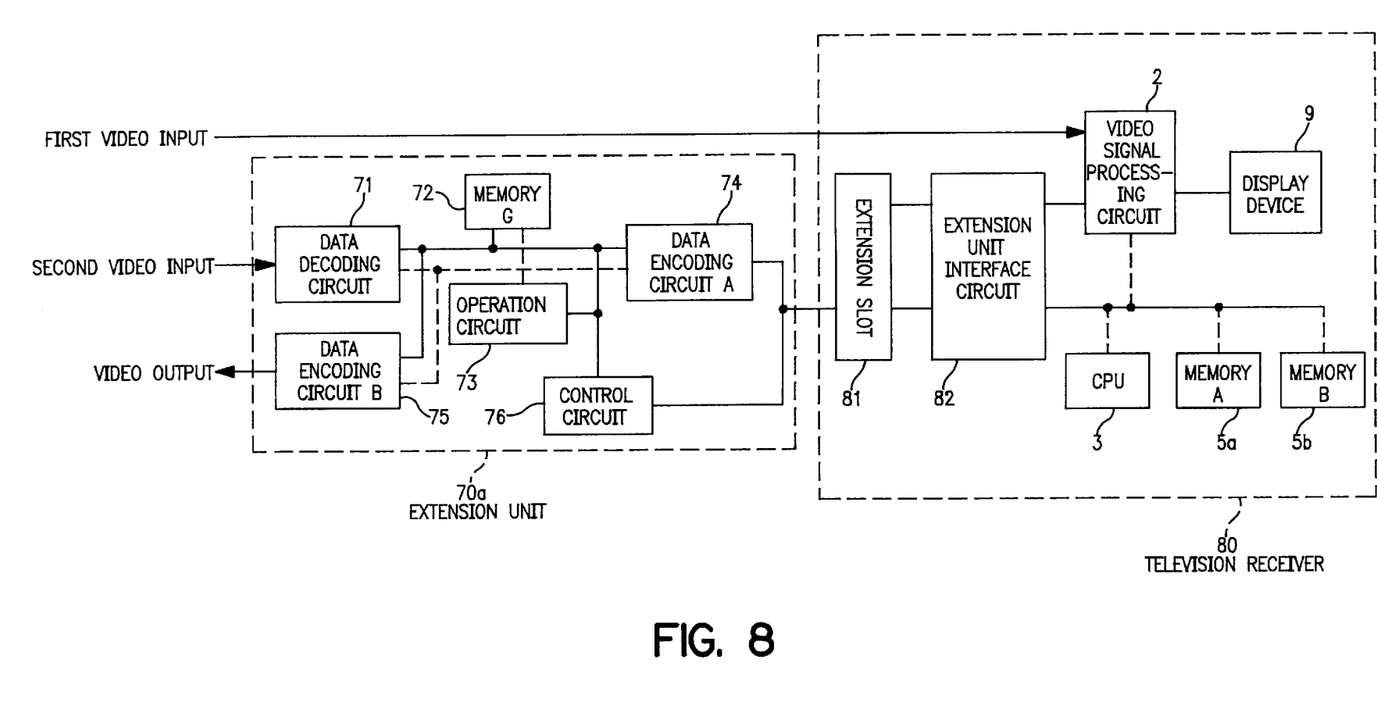
FIG. 8 is a block diagram of an embodiment of extension function process according to the invention.

FIG. 8 is one of such embodiments, being a block diagram showing essential parts of junction unit of an extension unit and the television receiver according to the invention.

In FIG. 8, a video signal processing circuit 2 receives a first video input signal, and decodes the video signal and controls the display. Besides, under the control of CPU 3, luminance, contrast, and color saturation are adjusted, the sharpness, gradation correction, and various picture qualities are set as mentioned above, or the video input is changed over, or on-screen display is presented. The data of these control values and display are stored in a memory A (5a), and a control program for controlling the video signal processing circuit 2 is stored in a memory B (5b).

Figure 9:
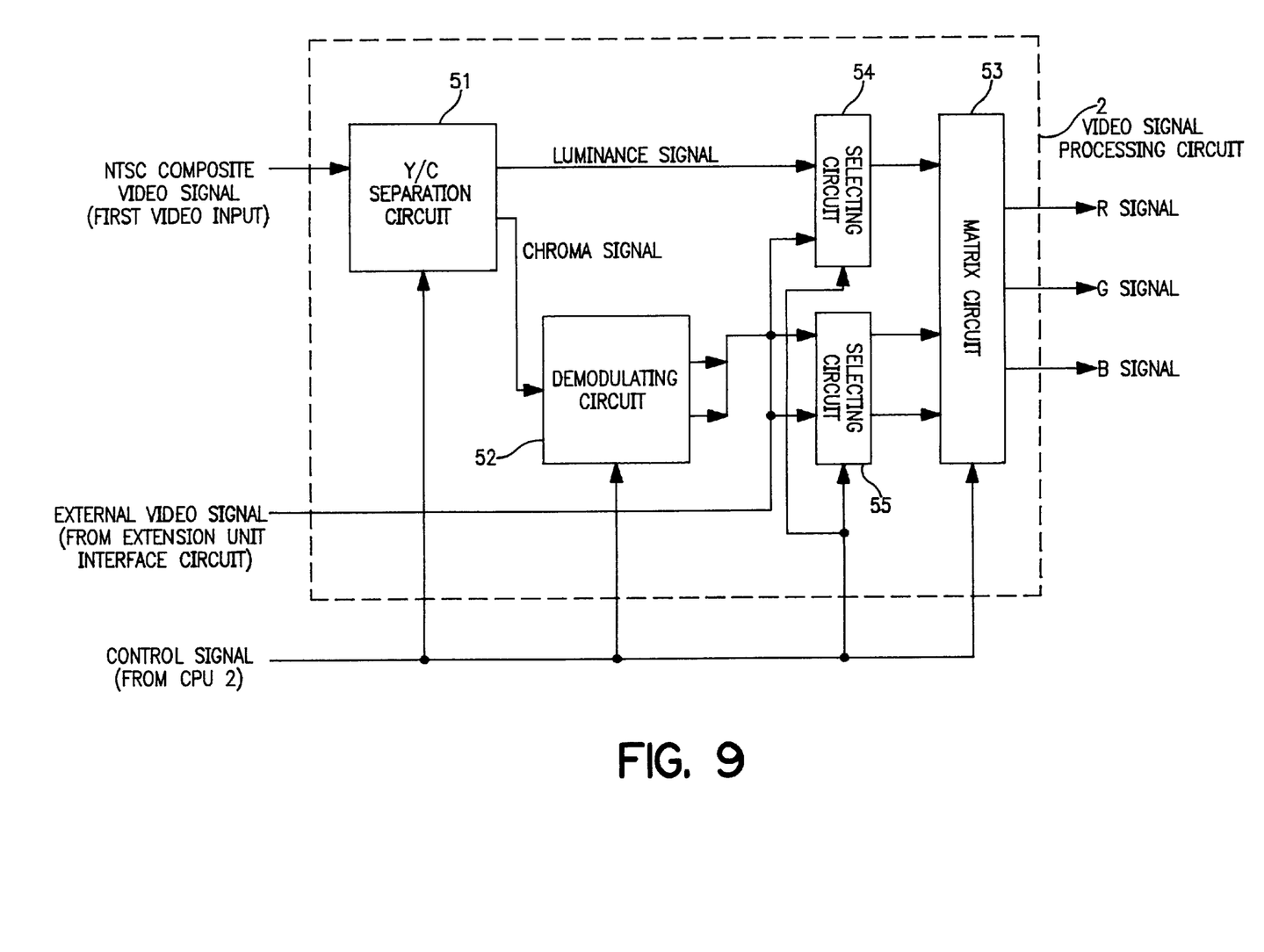
FIG. 9 is a block diagram of a video signal processing circuit in FIG. 8.

The video signal processing circuit 2 processes signals as described in detail below, and supplies RGB signals as output to a display device 9 such as CRT to display as a television image. A block diagram of a further specific embodiment of the video signal processing circuit 2 is shown in FIG. 9. In FIG. 9, an input NTSC composite video signal (first video input signal) is separated into a luminance signal and a chroma signal by a Y/C separation circuit 51. The separated chroma signal is demodulated into color difference signals in a demodulation circuit 52. The luminance signal separated in the Y/C separation circuit 51 and the color difference signal demodulated in the demodulation circuit 52 are supplied into a matrix circuit 53 respectively through selection circuit 54 and selection circuit 55.

The selection circuit 54 and selection circuit 55 select and change over the luminance signal and color difference signals of the first video input signal, and luminance signal and color difference signals of external video signal (second video input signal) supplied through extension unit 70a, extension slot 81, and extension unit interface circuit 82 shown in FIG. 8 and described later, by a control signal from the CPU 3.

In addition to the function described in signal processing of the first video input signal above, a second video input signal is fed into an extension unit for adding a new processing function. The second video input signal is converted into a parallel bus format by a data decoding circuit 71, and is stored in a memory G (72). The output signal of the data decoding circuit 71 stored in the memory G (72) is read out into an operation circuit 73. The operation circuit 73 decodes this signal by multi-screen display, freeze, strobe, or other trick play, and the decoded video signal is converted a format of luminance and color difference signals, and is stored again in the memory G (72).

The luminance signal and color difference signals, which are operation results in the operation circuit 73, stored in the memory G (72) are converted into serial bus format in data encoding circuit A (74) and data encoding circuit B (75) in order to decrease the number of signal lines. The output signal of the data encoding circuit A (74) is supplied into an extension unit interface circuit 82 through an extension slot 81, and the output signal of the data encoding circuit B (75) is supplied into an external device connection terminal. Each element in the extension unit 70a is controlled by a control signal generated by a control circuit 76.

The extension slot 81 is inserted between the extension unit 70a and extension unit interface circuit 82 in order to insert or detach the extension unit 70a in the television receiver 80 as required. The CPU 3 detects whether the extension unit 70a is connected to the extension slot 81 or not. When the extension unit 70a is not connected, the information is transmitted from the extension slot 81 into the CPU 3, and the information is further displayed on screen by a signal from the CPU 3. When the extension unit 70a is connected, the signal fed into the extension unit 70a is processed for additional function as mentioned above, and is supplied into the extension unit interface circuit 82 through the extension slot 81 as luminance signal and color difference signals.

The luminance signal and color difference signals in serial bus format supplied from the extension unit 70a are converted into signal of parallel bus format again in the extension unit interface circuit 82, and supplied into the signal processing circuit 2.

Meanwhile, the serial-parallel converting circuit in the extension unit interface circuit 82 is designed to be programmable by the data from the CPU 3, and the conversion processing program can be changed to convert adaptively, corresponding to the signals of various serial bus formats from the extension unit. That is, the function can be extended adaptively corresponding to various signal formats from the extension unit.

In the television receiver of the invention as shown above, by using an extension slot for detaching or attaching extension units capable of adding new processing functions, it is possible to exchange with other extension unit depending on the request of the user or application, so that the extension function can be changed easily.

Moreover, by having a memory for storing various control value data about extension unit, on-screen display data, or program for controlling the extension unit through the CPU, the function can be extended without changing the memory incorporated in the television receiver before function extension.

Figure 10:
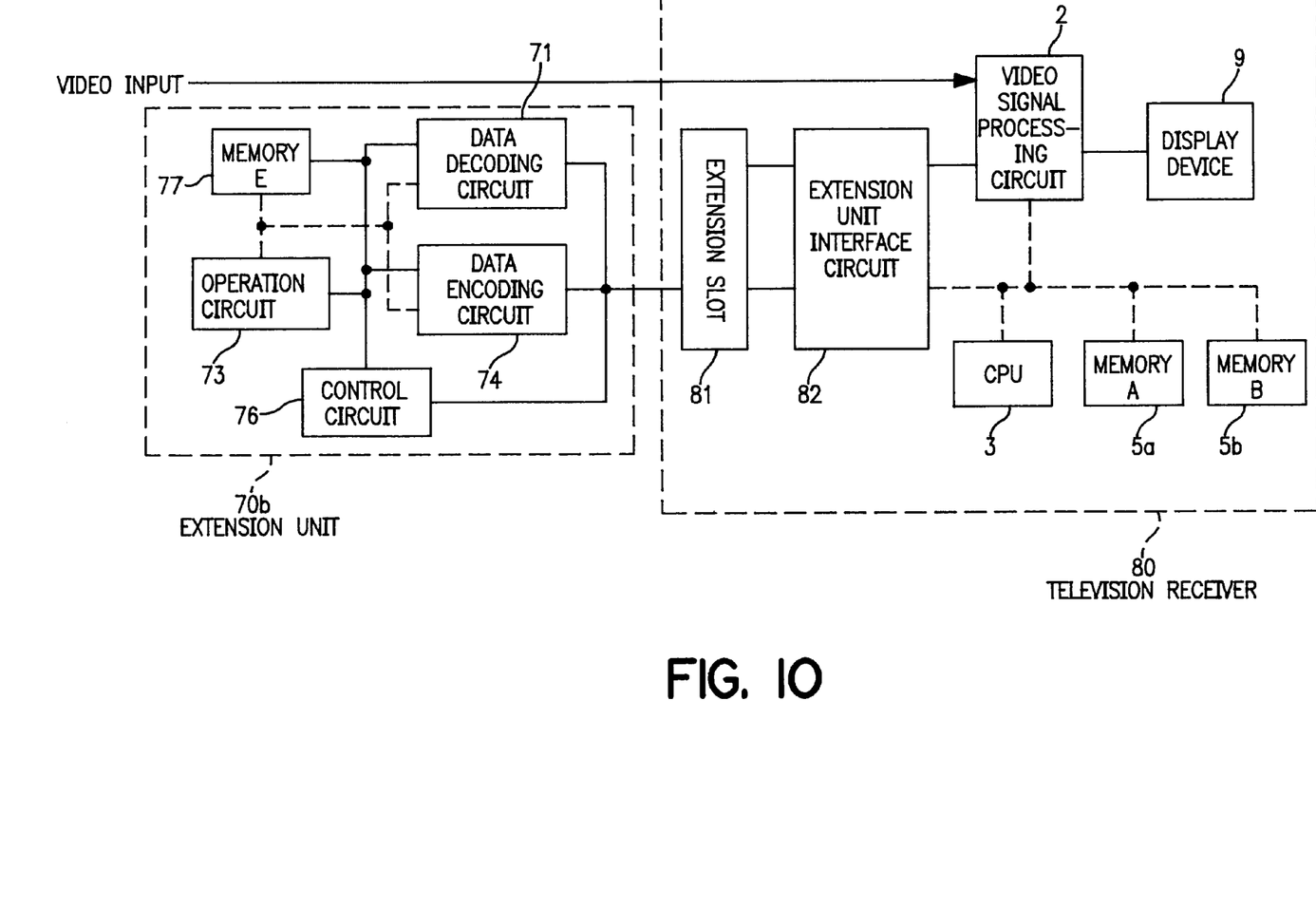
FIG. 10 is a block diagram of other embodiment of extension function process according to the invention.

FIG. 10 is a block diagram of other embodiment of the invention partially modifying the embodiment in FIG. 8. Herein, the function in the processing mode for adjusting parameters of signal such as amplitude in the video signal processing circuit of the television receiver is described.

In FIG. 10, an extension unit 70b is connected to a television receiver 80 through an extension slot 81. The CPU 3 measures parameter values of signal such as amplitude in the video signal processing circuit 2, and issues data in serial bus format to a data decoding circuit 71 of the extension unit 70b through an extension unit interface circuit 82 and extension slot 81. At the same time, the CPU 3 sends information telling start of communication of data to a control circuit 76. Receiving this information, the control circuit 76 sends a control signal to the data decoding circuit 71. The data decoding circuit 71 converts the measured value of each parameter supplied from the CPU 3 into parallel data by this control signal, and stores in a memory E (77).

Consequently, an operation circuit 73 reads out measured values of parameters stored in the memory E (77), and calculates the correction value of each parameter so that each parameter may be an appropriate value. Thus calculated correction values are stored again in the memory E (77). The memory writing and reading control signals at this time are supplied from the control circuit 76. The correction data of parameters stored in the memory E (77) in this manner are put into a data encoding circuit 74, and converted into serial bus format. The output signal in serial bus format issued from the data encoding circuit 74 is stored in a memory A (5a) as control value information of the video signal processing circuit 2 by the CPU 3 through the extension unit 81 and extension unit interface circuit 82.

When measurement of all parameters, calculation of correction values, and storage into memory A (5a) are over, the extension unit 70b is detached from the television receiver, and the television receiver returns to an ordinary mode, and the CPU 3 controls the video signal processing circuit 2 on the basis of this correction value. Therefore, according to the embodiment, calculation of adjustment data, and storage of calculated values in the memory in the television receiver differing in each unit of television receiver can be done easily.

Herein, meanwhile, as an embodiment for extension of function of the television receiver according to the embodiment, connection of extension unit through extension slot is explained by referring to the drawing, but it is also possible to connect the extension slot to the extension unit interface circuit in the television receiver without resort to extension slot or to connect directly to the video signal processing circuit.

Moreover, of the constituent elements in the extension unit shown in the embodiments in FIG. 8 and FIG. 10, a part can be deformed or omitted as required. For example, if signal output to external device is not needed in FIG. 8, the data encoding circuit B can be omitted.

Thus, the invention is not limited to the above embodiments alone, and various modifications are possible. All modified examples included in the true spirit and scope of the invention are included in the scope of the claims.

What is claimed:

1. A television receiver including a display for displaying a video signal as a television image, said television receiver comprising:
information extracting means for obtaining information from at least one of a format and content of the video signal,
memory means for storing at least one of a computer program and a plurality of data values, and
video signal processing means for
  a) adaptively processing said video signal into a processed video signal based on one of said computer program and data values supplied from said memory means, and
  b) deforming at least one of said computer program and said data values to be adaptive based on the information obtained from said information extracting means; and CPU means for controlling and operating:
    a) said information extracting means,
    b) said video signal processing means, and
    c) said memory means,
wherein said video signal processing means includes means for correcting a gradation of said video signal by using a gradation correction table created by said CPU means from histogram data of said video signal based on the information extracted by said information extracting means.

2. A television receiver including a display for displaying a video signal as a television image, said television receiver comprising:
information extracting means for obtaining information from at least one of a format and content of the video signal,
memory means for storing at least one of a computer program and a plurality of data values, and
video signal processing means for
  a) adaptively processing said video signal into a processed video signal based on one of said computer program and data values supplied from said memory means, and
  b) deforming at least one of said computer program and said data values to be adaptive based on the information obtained from said information extracting means,
wherein said video signal processing means comprises a look-up table memory means and a programmable operation means for processing said video signal according to a content in said look-up table memory means, and programmable signal processing is executed according to a deformed content of said look-up table memory means, by deforming the content of said look-up table memory means depending on the video signal format information obtained from the information extracting means.

3. A television receiver including a display for displaying a video signal as a television image, said television receiver comprising:
information extracting means for obtaining information from at least one of a format and content of the video signal,
memory means for storing at least one of a computer program and a plurality of data values, and
video signal processing means for
  a) adaptively processing said video signal into a processed video signal based on one of said computer program and data values supplied from said memory means, and
  b) deforming at least one of said computer program and said data values to be adaptive based on the information obtained from said information extracting means,
wherein said video signal processing means includes means for adding data for a line of an on-screen display, said line corresponding to an identical vertical position of a line in said video signal, for a portion of the line supplied from said memory means to said video signal for the portion of one line corresponding to an on-screen display region extracted from the information extracting means, and processes the video signal to which said data for said on-screen display is added.

4. A television receiver including a display for displaying a video signal as a television image, said television receiver comprising:
    information extracting means for obtaining information from at least one of a format and content of the video signal,
    memory means for storing at least one of a computer program and a plurality of data values, and
    video signal processing means for
        a) adaptively processing said video signal into a processed video signal based on one of said computer program and data values supplied from said memory means, and
        b) deforming at least one of said computer program and said data values to be adaptive based on the information obtained from said information extracting means,
    wherein said video signal processing means includes filtering means for filtering said video signal according to a program selected and supplied by said CPU means from said memory means based on a mode of said video signal obtained from said information extracting means, and supplies an output of the filtering means filtered according to the program suited to said video signal processing means to a scanning velocity modulation coil of a CRT which is said display device.

5. A television receiver of claim 4,
    wherein an amplitude of an output signal of said filtering means is adjusted by gain adjusting means, and is converted into an analog signal by D/A converter means and supplied to said scanning velocity modulation coil.

6. A television receiver of claim 4,
    wherein a current value flowing in said scanning velocity modulation coil is converted into a voltage value by a current/voltage converter means, the level of the voltage value is detected, and said CPU means changes one of a characteristic of said filtering means and a characteristic of said gain adjustment means responsive to a detection result from said current/voltage converter means.

7. A television receiver of claim 5,
    wherein a current value flowing in said scanning velocity modulation coil is converted into a voltage value by a current/voltage converter means, the level of the voltage value is detected, and said CPU means changes one of a characteristic of said filtering means and a characteristic of said gain adjustment means responsive to a detection result from said current/voltage converter means.

8. A television receiver, including a display for displaying a video signal as a television image, said television receiver comprising:
    information extracting means for obtaining information from at least one of a format and content of the video signal,
    first memory means for storing at least one of a computer program and data values,
    video signal processing means for
        a) adaptively processing said video signal into a processed video signal based on one of said computer program and data values supplied from said first memory means, and
        b) deforming at least one of said computer program and said data values to be adaptive based on the information obtained from said information extracting means,
    extension unit means for adding a further signal processing function, and
    extension unit interface circuit means for connecting said extension unit means to said video signal processing means.

9. A television receiver of claim 8, wherein said extension unit interface circuit further comprises:
    data decoding circuit means for converting an input video signal into a parallel bus format signal,
    operation circuit means for one of decoding the format and converting the signal format of the parallel bus format signal of said data decoding circuit means,
    second memory means for storing the parallel bus format signal of said data decoding circuit means and an operation result of said operation circuit means,
    first data encoding circuit means for converting the operation result of said operation circuit means read out from said memory means into a first serial bus format signal, and providing said first serial bus format signal to a first external device connection terminal,
    second data encoding circuit means for converting the operation result of said operation circuit means read out from said memory means into a second serial bus format signal, and providing said second serial bus format signal to a second external device connection terminal, and
    control circuit means for generating a plurality of control signals for:
        a) said data decoding circuit means,
        b) said second memory means,
        c) said operation circuit means,
        d) said first data encoding circuit means, and
        e) said second data encoding circuit means.

10. A television receiver of claim 8, wherein said extension unit interface circuit further comprises:
    data encoding circuit means for converting externally provided transmitted data into a serial bus format and supplying said serial data to an external device,
    second memory means for storing the externally provided transmitted data, and
    control circuit means for controlling data transmission timing of said data encoding circuit means and said second memory means.

11. A television receiver of claim 8, wherein said extension unit interface circuit further comprises:
    data decoding circuit means for converting input data into parallel bus format data,
    operation circuit means for calculating and storing a correction value from detection data obtained from said data decoding circuit means,
    second memory means for storing at least one of the parallel bus format data of said data decoding circuit means and the correction value obtained from said operation circuit means,
    data encoding circuit means for converting the correction value of the output of said operation circuit means stored in said memory means into a serial bus format signal and delivering said serial bus format signal to an external device, and control circuit means for generating a plurality of control signals for:
  a) said data decoding circuit means,
  b) said second memory means,
  c) said operation circuit means, and
  d) said data encoding circuit means.

12. A television receiver of claim 8, wherein said extension unit interface circuit further comprises:

data decoding circuit means for converting the video signal into a parallel bus format signal, operation circuit means for processing the parallel bus format signal of said data decoding circuit means by one of format decoding and signal format conversion, second memory means for storing the parallel bus format signal of said data decoding circuit means and an operation result of said operation circuit means, data encoding circuit means for converting the operation result of said operation circuit means read out from said memory means into a further serial bus format signal, and control circuit means for generating a plurality of control signals for:
  a) said data encoding circuit means,
  b) said data decoding circuit means,
  c) said second memory means,
  d) said operation circuit means, and
  e) said data encoding circuit means.

13. A television receiver of claim 8 further comprising:

CPU means for controlling and operating:
  a) said information extracting means,
  b) said video signal processing means, and
  c) said memory means.

14. A television receiver of claim 13, wherein said extension unit interface circuit means has a function of converting a serial bus format signal supplied from said extension unit means into a parallel bus format signal, said parallel bus format signal provided to said video signal processing means for processing according to one of the computer program and the data values supplied from said first memory means by said CPU means.

15. A television receiver of claim 14, wherein said extension unit interface circuit further comprises:

data encoding circuit means for converting externally provided transmitted data into a serial bus format and supplying said serial data to an external device, second memory means for storing the externally provided transmitted data, and control circuit means for controlling data transmission timing of said data encoding circuit means and said second memory means.

16. A television receiver of claim 14, wherein said extension unit interface circuit further comprises:

data decoding circuit means for converting input data into parallel bus format data, operation circuit means for calculating and storing a correction value from detection data obtained from said data decoding circuit means, second memory means for storing at least one of the parallel bus format data of said data decoding circuit means and the correction value obtained from said operation circuit means, data encoding circuit means for converting the correction value of the output of said operation circuit means stored in said memory means into a serial bus format signal and delivering said serial bus format signal to an external device, and control circuit means for generating a plurality of control signals for:
  a) said data decoding circuit means,
  b) said second memory means,
  c) said operation circuit means, and
  d) said data encoding circuit means.

17. A television receiver of claim 14, wherein said extension unit interface circuit further comprises:

data decoding circuit means for converting the video signal into a parallel bus format signal, operation circuit means for processing the parallel bus format signal of said data decoding circuit means by one of format decoding and signal format conversion, second memory means for storing the parallel bus format signal of said data decoding circuit means and an operation result of said operation circuit means, data encoding circuit means for converting the operation result of said operation circuit means read out from said memory means into a further serial bus format signal, and control circuit means for generating a plurality of control signals for:
  a) said data encoding circuit means,
  b) said data decoding circuit means,
  c) said second memory means,
  d) said operation circuit means, and
  e) said data encoding circuit means.

18. A television receiver of claim 14, wherein said extension unit interface circuit further comprises:

data decoding circuit means for converting an input video signal into a parallel bus format signal, operation circuit means for one of decoding the format and converting the signal format of the parallel bus format signal of said data decoding circuit means, second memory means for storing the parallel bus format signal of said data decoding circuit means and an operation result of said operation circuit means, first data encoding circuit means for converting the operation result of said operation circuit means read out from said memory means into a first serial bus format signal, and providing said first serial bus format signal to a first external device connection terminal, second data encoding circuit means for converting the operation result of said operation circuit means read out from said memory means into a second serial bus format signal, and providing said second serial bus format signal to a second external device connection terminal, and control circuit means for generating a plurality of control signals for:
  a) said data decoding circuit means,
  b) said second memory means,
  c) said operation circuit means,
  d) said first data encoding circuit means, and
  e) said second data encoding circuit means.

19. A television receiver for use with a video signal comprising:

information extracting means for obtaining information from at least one of a format and content of the video signal, first memory means for storing at least one of a computer program and data values, video signal processing means for
  a) adaptively processing said video signal into a processed video signal based on one of said computer program and data values supplied from said first memory means, and
  b) deforming at least one of said computer program and said data values to be adaptive based on the information obtained from said information extracting means, extension slot means for one of attaching and detaching an extension unit means for adding a further signal processing function, and extension unit interface circuit means connected between said extension slot means and said video signal processing means, said extension unit interface circuit means having a function of signal interface between said extension slot means and said video signal processing means.

20. A television receiver of claim 9, wherein said extension unit interface circuit further comprises:

data encoding circuit means for converting externally provided transmitted data into a serial bus format and supplying said serial data to an external device, second memory means for storing the externally provided transmitted data, and control circuit means for controlling data transmission timing of said data encoding circuit means and said second memory means.

21. A television receiver of claim 19, wherein said extension unit interface circuit further comprises:

data decoding circuit means for converting input data into parallel bus format data, operation circuit means for calculating and storing a correction value from detection data obtained from said data decoding circuit means, second memory means for storing at least one of the parallel bus format data of said data decoding circuit means and the correction value obtained from said operation circuit means, data encoding circuit means for converting the correction value of the output of said operation circuit means stored in said memory means into a serial bus format signal and delivering said serial bus format signal to an external device, and control circuit means for generating a plurality of control signals for:
  a) said data decoding circuit means,
  b) said second memory means,
  c) said operation circuit means, and
  d) said data encoding circuit means.

22. A television receiver of claim 19, wherein said extension unit interface circuit further comprises:

data decoding circuit means for converting the video signal into a parallel bus format signal, operation circuit means for processing the parallel bus format signal of said data decoding circuit means by one of format decoding and signal format conversion, second memory means for storing the parallel bus format signal of said data decoding circuit means and an operation result of said operation circuit means, data encoding circuit means for converting the operation result of said operation circuit means read out from said memory means into a further serial bus format signal, and control circuit means for generating a plurality of control signals for:
  a) said data encoding circuit means,
  b) said data decoding circuit means,
  c) said second memory means,
  d) said operation circuit means, and
  e) said data encoding circuit means.

23. A television receiver of claim 19, wherein said extension unit interface circuit further comprises:

data decoding circuit means for converting an input video signal into a parallel bus format signal, operation circuit means for one of decoding the format and converting the signal format of the parallel bus format signal of said data decoding circuit means, second memory means for storing the parallel bus format signal of said data decoding circuit means and an operation result of said operation circuit means, first data encoding circuit means for converting the operation result of said operation circuit means read out from said memory means into a first serial bus format signal, and providing said first serial bus format signal to a first external device connection terminal, second data encoding circuit means for converting the operation result of said operation circuit means read out from said memory means into a second serial bus format signal, and providing said second serial bus format signal to a second external device connection terminal, and control circuit means for generating a plurality of control signals for:
  a) said data decoding circuit means,
  b) said second memory means,
  c) said operation circuit means,
  d) said first data encoding circuit means, and
  e) said second data encoding circuit means.

24. A television receiver of claim 19 further comprising:

CPU means for controlling and operating:
  a) said information extracting means,
  b) said video signal processing means, and
  c) said memory means.

25. A television receiver of claim 24, wherein said extension unit interface circuit means has a function of converting a serial bus format signal supplied from said extension unit means into a parallel bus format signal, said parallel bus format signal provided to said video signal processing means for processing according to one of the computer program and the data values supplied from said first memory means by said CPU means.

26. A television receiver of claim 25, wherein said extension unit interface circuit further comprises:

data encoding circuit means for converting externally provided transmitted data into a serial bus format and supplying said serial data to an external device, second memory means for storing the externally provided transmitted data, and control circuit means for controlling data transmission timing of said data encoding circuit means and said second memory means.

27. A television receiver of claim 25, wherein said extension unit interface circuit further comprises:

data decoding circuit means for converting input data into parallel bus format data, operation circuit means for calculating and storing a correction value from detection data obtained from said data decoding circuit means, second memory means for storing at least one of the parallel bus format data of said data decoding circuit means and the correction value obtained from said operation circuit means, data encoding circuit means for converting the correction value of the output of said operation circuit means stored in said memory means into a serial bus format signal and delivering said serial bus format signal to an external device, and control circuit means for generating a plurality of control signals for:
  a) said data decoding circuit means,
  b) said second memory means,
  c) said operation circuit means, and
  d) said data encoding circuit means.

28. A television receiver of claim 25, wherein said extension unit interface circuit further comprises:

data decoding circuit means for converting the video signal into a parallel bus format signal, operation circuit means for processing the parallel bus format signal of said data decoding circuit means by one of format decoding and signal format conversion, second memory means for storing the parallel bus format signal of said data decoding circuit means and an operation result of said operation circuit means, data encoding circuit means for converting the operation result of said operation circuit means read out from said memory means into a further serial bus format signal, and control circuit means for generating a plurality of control signals for:
  a) said data encoding circuit means,
  b) said data decoding circuit means,
  c) said second memory means,
  d) said operation circuit means, and
  e) said data encoding circuit means.

29. A television receiver of claim 25, wherein said extension unit interface circuit further comprises:

data decoding circuit means for converting an input video signal into a parallel bus format signal, operation circuit means for one of decoding the format and converting the signal format of the parallel bus format signal of said data decoding circuit means, second memory means for storing the parallel bus format signal of said data decoding circuit means and an operation result of said operation circuit means, first data encoding circuit means for converting the operation result of said operation circuit means read out from said memory means into a first serial bus format signal, and providing said first serial bus format signal to a first external device connection terminal, second data encoding circuit means for converting the operation result of said operation circuit means read out from said memory means into a second serial bus format signal, and providing said second serial bus format signal to a second external device connection terminal, and control circuit means for generating a plurality of control signals for:
  a) said data decoding circuit means,
  b) said second memory means,
  c) said operation circuit means,
  d) said first data encoding circuit means, and
  e) said second data encoding circuit means.

* * * * *

UNITED STATES PATENT AND TRADEMARK OFFICE
CERTIFICATE OF CORRECTION

| | | |
|---|---|---|
| PATENT NO. | : 5,982,449 | Page 1 of 1 |
| DATED | : November 9, 1999 | |
| INVENTOR(S) | : Nagai et al. | |

It is certified that error appears in the above-identified patent and that said Letters Patent is hereby corrected as shown below:

<u>Column 13,</u>
Line 21, "9" should read --19--.

Signed and Sealed this

Twenty-sixth Day of June, 2001

Attest:

*Nicholas P. Godici*

NICHOLAS P. GODICI
*Attesting Officer*     *Acting Director of the United States Patent and Trademark Office*